US010565026B2

(12) United States Patent
Vranjes et al.

(10) Patent No.: US 10,565,026 B2
(45) Date of Patent: Feb. 18, 2020

(54) CONTAINING AN APPLICATION IN AN IMMERSIVE NON-WINDOWED ENVIRONMENT

(71) Applicant: Microsoft Technology Licensing, LLC, Redmond, WA (US)

(72) Inventors: Miron Vranjes, Seattle, WA (US); Nils Anders Sundelin, Duvall, WA (US); Bret P. Anderson, Seattle, WA (US); Alex Snitkovskiy, Renton, WA (US); Robert J. Jarrett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 631 days.

(21) Appl. No.: 14/813,091

(22) Filed: Jul. 29, 2015

(65) Prior Publication Data

US 2017/0031533 A1 Feb. 2, 2017

(51) Int. Cl.
*G06F 9/54* (2006.01)
*G06F 9/448* (2018.01)
*G06F 9/451* (2018.01)

(52) U.S. Cl.
CPC ............ *G06F 9/541* (2013.01); *G06F 9/4486* (2018.02); *G06F 9/451* (2018.02)

(58) Field of Classification Search
CPC ....... G06F 9/541; G06F 9/4426; G06F 9/4443
See application file for complete search history.

(56) References Cited

U.S. PATENT DOCUMENTS 5,831,609 A * 11/1998 London .................. G06F 3/1454
715/746
6,229,537 B1 * 5/2001 Sobeski .................... G09G 5/14
715/781

(Continued)

FOREIGN PATENT DOCUMENTS

WO 2012045074 A2 4/2012
WO 2014035936 A2 3/2014

OTHER PUBLICATIONS

Jason Yeo, Virtual Desktop Optimisation—Enforcing Windows Visual Effects, vChips (Jul. 21 2014), vchips.imutroom.com/2014/07/virtual-desktop-optimisation-windows-visual-effects/ (Year: 2014).*

(Continued)

*Primary Examiner* — Justin R. Blaufeld
(74) *Attorney, Agent, or Firm* — Wade IP Law LLC

(57) ABSTRACT

Techniques are described herein that are capable of containing an application in an immersive non-windowed environment. For instance, the application may be configured for use in a windowed environment. Containing the application in the immersive non-windowed environment may involve selectively implementing functionality that is associated with the application based at least in part on whether the functionality is applicable to the immersive non-windowed environment. For example, when a request to implement functionality that is not applicable to the immersive non-windowed environment is received, functionality that is applicable to the immersive non-windowed environment may be implemented in lieu of the functionality that is not applicable to the immersive non-windowed environment. In another example, no action may be taken with regard to the request.

20 Claims, 9 Drawing Sheets

(56) References Cited

U.S. PATENT DOCUMENTS

| | | |
|---|---|---|
| 6,446,071 B1 | 9/2002 | Callaway et al. |
| 6,484,309 B2 | 11/2002 | Nowlin et al. |
| 7,093,267 B2 | 8/2006 | Beaumont et al. |
| 8,151,105 B2 | 4/2012 | Park et al. |
| 8,312,385 B2 | 11/2012 | Bier |
| 9,064,292 B1* | 6/2015 | Tidd .................... G06T 1/00 |
| 2002/0080184 A1 | 6/2002 | Wishoff |
| 2011/0202872 A1* | 8/2011 | Park ................ G06F 3/0481 |
| | | 715/790 |
| 2012/0081396 A1* | 4/2012 | Yusupov ........... H04L 67/1095 |
| | | 345/635 |
| 2012/0167005 A1* | 6/2012 | Matthews ............. G09G 5/14 |
| | | 715/799 |
| 2012/0296959 A1 | 11/2012 | Momchilov et al. |
| 2012/0304102 A1* | 11/2012 | LeVee ................ G06F 9/451 |
| | | 715/779 |
| 2012/0304103 A1* | 11/2012 | LeVee ................ G06F 9/451 |
| | | 715/779 |
| 2012/0324365 A1* | 12/2012 | Momchilov ........... G06F 3/14 |
| | | 715/738 |
| 2013/0002725 A1* | 1/2013 | Kim .................. G06F 3/0482 |
| | | 345/684 |
| 2013/0031618 A1* | 1/2013 | Momchilov ........... G06F 3/14 |
| | | 726/7 |
| 2013/0139103 A1* | 5/2013 | Laborczfalvi ....... G06F 3/0484 |
| | | 715/794 |
| 2014/0033271 A1* | 1/2014 | Barton ................ H04L 67/10 |
| | | 726/1 |
| 2014/0101675 A1* | 4/2014 | VanBlon .............. G06F 9/451 |
| | | 719/319 |
| 2015/0281333 A1* | 10/2015 | Albert .................. H04L 67/10 |
| | | 715/744 |

OTHER PUBLICATIONS

Windows Seven Forums, Windows 7: Problem with "Show window contents while dragging", https://www.sevenforums.com/general-discussion/103275-problem-show-window-contents-while-dragging.html, (Aug. 10, 2010) (Year: 2010).*

"PowWow", Published on: Apr. 7, 2015, 9 pages, Available at: http://www.powwow.net/solutions#innovative-technology.

"PowWow: The Path to True Enterprise Mobilization", Published on: Apr. 2, 2015, 4 pages, Available at: http://www.powwow.net/.

Thurrott, Paul, "Windows 10 Technical Preview 2 Tip: Enable Tablet Modev", Published on: Jan. 26, 2015, 7 pages, Available at: https://www.thurrott.com/windows/windows-10/752/windows-10-technical-preview-2-tip-enable-tablet-mode.

Thurrott, Paul, "Windows 8 Tip: Run Metro Apps in Windows on the Desktop", Published on: Mar. 6, 2013, 12 pages, Available at: http://winsupersite.com/windows-8/windows-8-tip-run-metro-apps-windows-desktop.

"Window Manager", Retrieved on: Apr. 30, 2015, 4 pages, Available at: https://developer.brewmp.com/reference/api/brew_mp_1.0.2_pro/ui/window_manager.

"Sencha Ext JS 5 Streamlines Desktop and Mobile Application Development from One Unified Platform", Published on: Jun. 2, 2014, 4 pages, Available at: http://www.sencha.com/company/press/sencha-ext-js-5-streamlines-desktop-and-mobile-application-development-from/.

* cited by examiner

CONTAINING AN APPLICATION IN AN IMMERSIVE NON-WINDOWED ENVIRONMENT

BACKGROUND

Over the past several decades, many applications (e.g., conventional desktop applications) have been configured for use in a windowed environment. A windowed environment is an environment in which applications are displayed in free-floating windows whose positioning is controlled by the applications that are displayed therein. For instance, the applications may be configured to call APIs that enable the applications to position themselves, spawn new windows that layer on top of their existing windows, etc. Accordingly, the windowed environment may have a z-order, which enables windows to be occluded by other windows.

Recent developments in the computer industry have led to applications that are configured for use in an immersive non-windowed environment in lieu of the traditional windowed environment. For instance, applications on devices such as tablet computers and personal digital assistants commonly are configured for use in the immersive non-windowed environment. An immersive non-windowed environment is an environment in which applications are not displayed in free-floating windows whose positioning is controlled by the applications that are displayed therein. Moreover, an immersive non-windowed environment traditionally does not have a z-order and therefore traditionally does not support occlusion of windows by other windows. In an immersive non-windowed environment, an application often is presented full-screen, meaning that the application consumes an entirety of the screen.

Windows® 8/8.1, which is developed and distributed by Microsoft Corporation, configures an entire desktop as an application, which may include all windows for the various other applications that are executed by a device. Accordingly, the application may enable windows to occlude other windows within the context of the application, even though occlusion is not applicable to the immersive non-windowed environment. However, enabling windows to occlude other windows in the context of the application may cause confusion for users.

SUMMARY

Various approaches are described herein for, among other things, containing an application (e.g., a computer application or a desktop computer application) in an immersive non-windowed environment. In accordance with these approaches, the application may be configured for use in a windowed environment. For instance, containing the application in the immersive non-windowed environment may involve selectively implementing functionality that is associated with the application based at least in part on whether the functionality is applicable to the immersive non-windowed environment. For example, when a request to implement functionality that is not applicable to the immersive non-windowed environment is received, functionality that is applicable to the immersive non-windowed environment may be implemented in lieu of the functionality that is not applicable to the immersive non-windowed environment. In another example, no action may be taken with regard to the request.

In a first example approach, a communication channel is established between an application and an operating system to broker window-related communications between the application and the operating system. A windowing policy is enforced via the communication channel in an immersive non-windowed environment using the window-related communications.

In a second example approach, APIs that are associated with an application are redefined from a first definition state to a second definition state based at least in part on the application being in an immersive non-windowed environment. The first definition state is characterized by the APIs defining window-based functionalities. The second definition state is characterized by the APIs defining immersive non-windowed functionalities. An API call for a designated API is received from the application. A first functionality of the window-based functionalities is defined by the designated API in the first state. A second functionality of the immersive non-windowed functionalities is defined by the designated API in the second state. The second functionality is implemented in lieu of the first functionality in response to receiving the API call.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 4, 5A, 5B, and 6 depict flowcharts of example methods for enforcing a windowing policy in accordance with embodiments.

Figure 3:
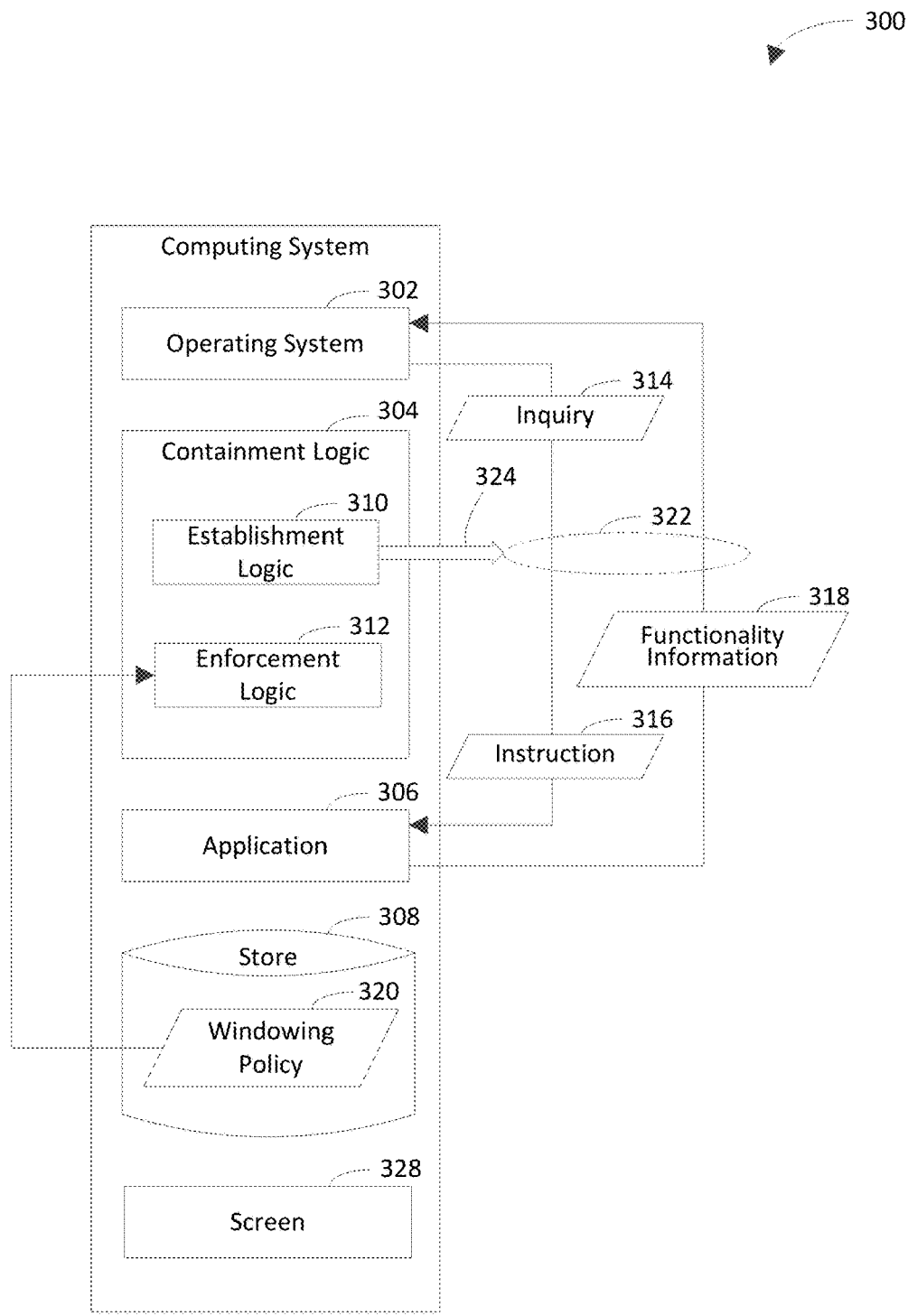
FIGS. 3 and 9 are block diagrams of example computing systems in accordance with embodiments.
Figure 7:
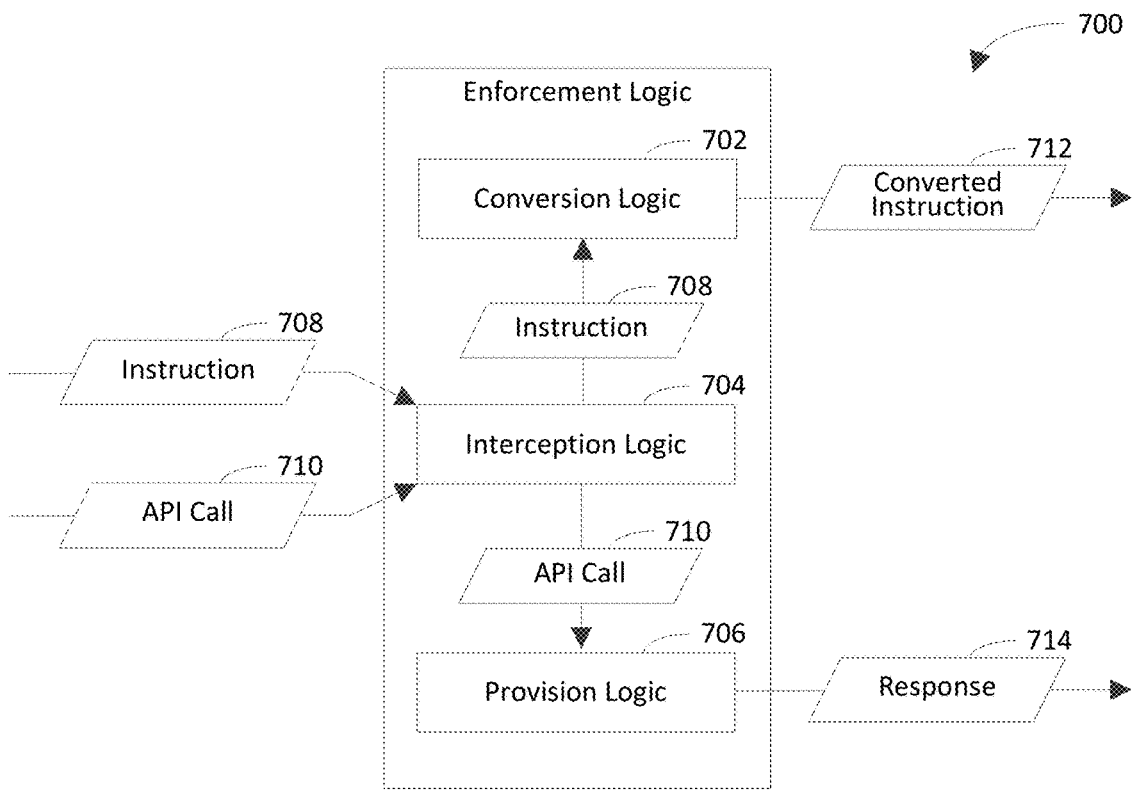

FIG. 7 is a block diagram of an example implementation of enforcement logic shown in FIG. 3 in accordance with an embodiment.

Figure 8:
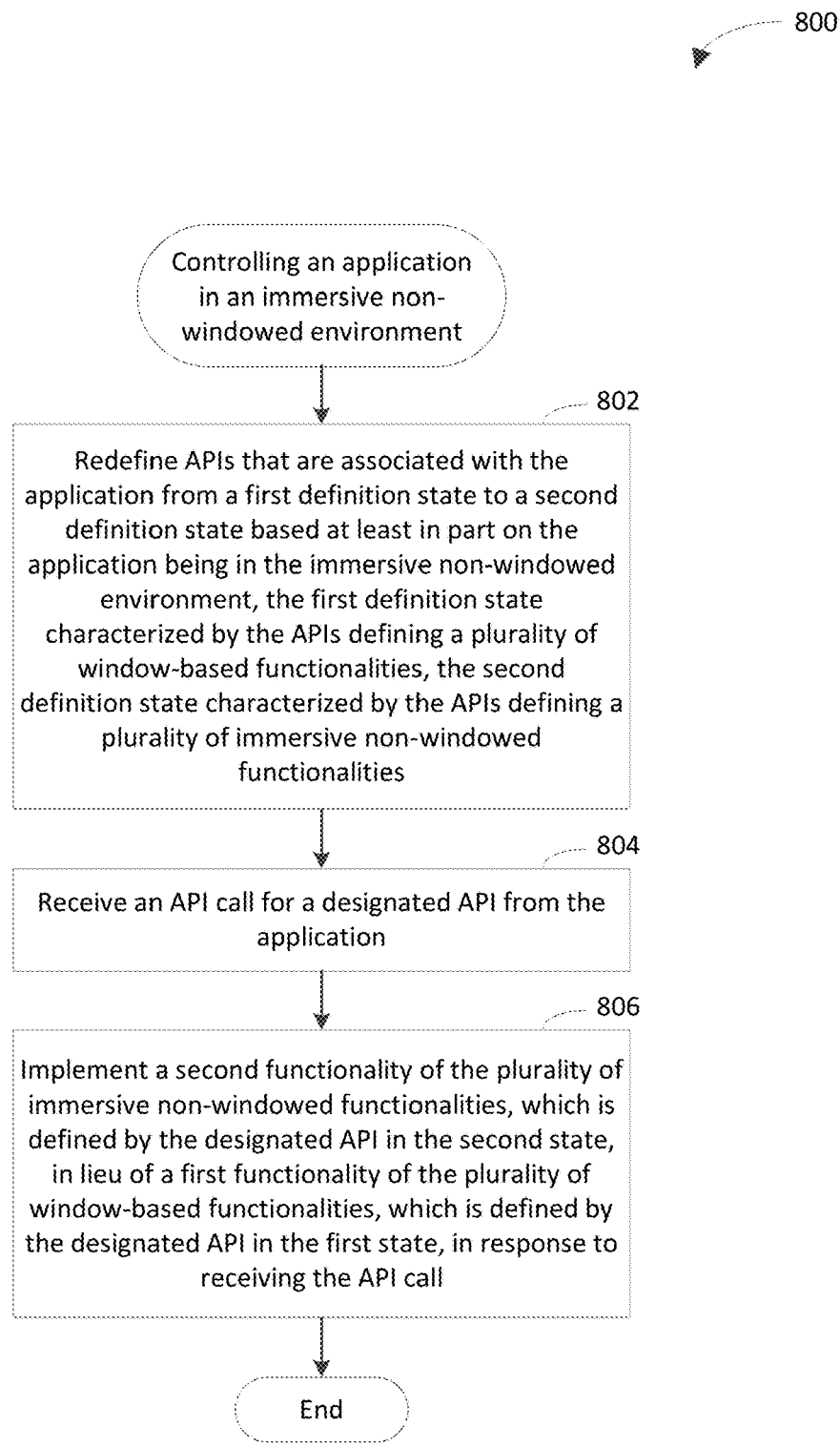

FIG. 8 depicts a flowchart of an example method for controlling an application in an immersive non-windowed environment in accordance with an embodiment.

Figure 9:
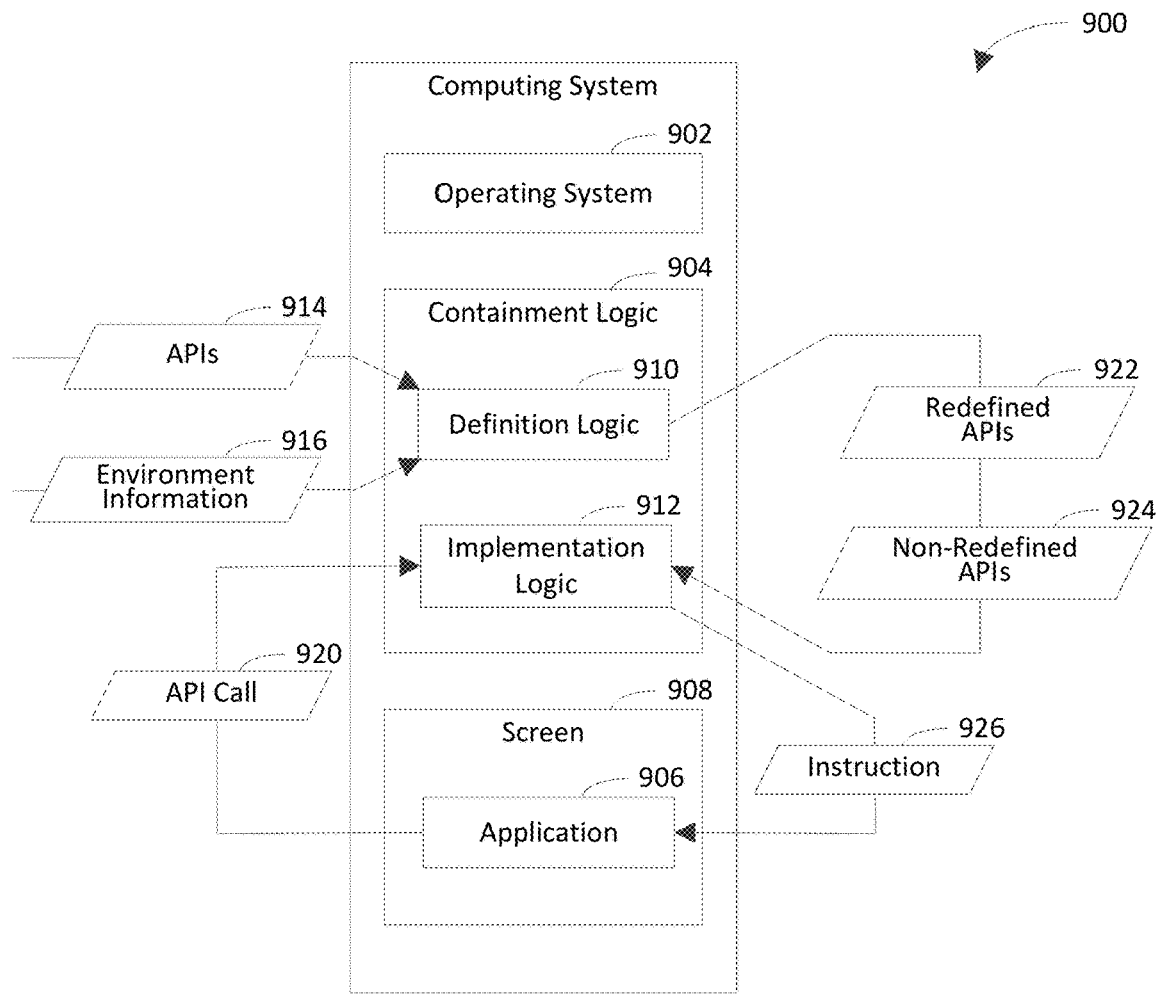
Figure 10:
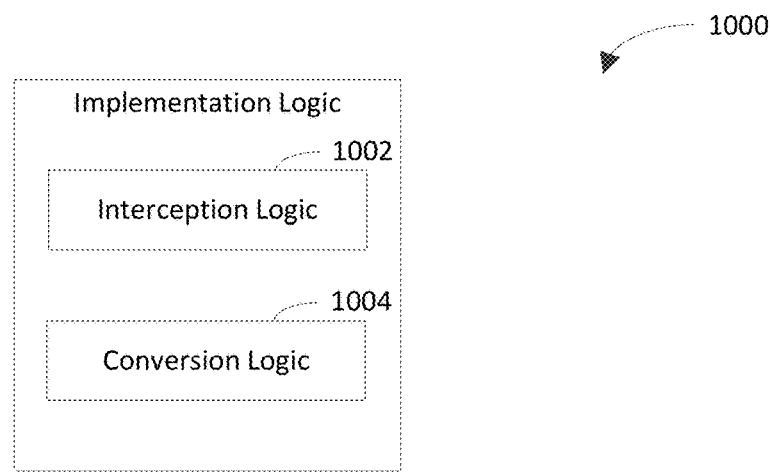

FIG. 10 is a block diagram of an example implementation of implementation logic shown in FIG. 9 in accordance with an embodiment.

Figure 11:
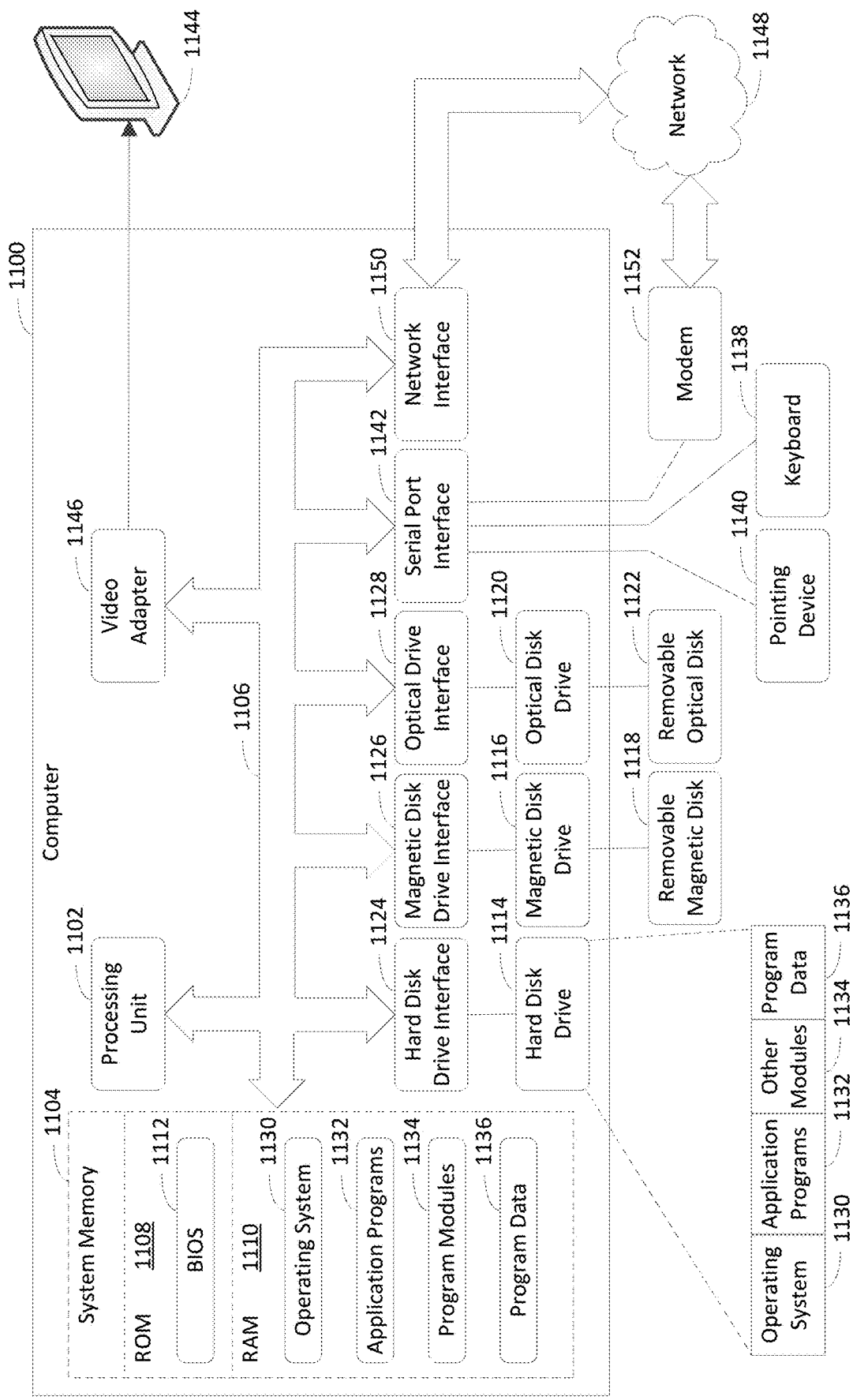

FIG. 11 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of containing an application (e.g., a computer application or a desktop computer application) in an immersive non-windowed environment. In accordance with the example embodiments, the application may be configured for use in a windowed environment. For instance, containing the application in the immersive non-windowed environment may involve selectively implementing functionality that is associated with the application based at least in part on whether the functionality is applicable to the immersive non-windowed environment. For example, when a request to implement functionality that is not applicable to the immersive non-windowed environment is received, functionality that is applicable to the immersive non-windowed environment may be implemented in lieu of the functionality that is not applicable to the immersive non-windowed environment. In another example, no action may be taken with regard to the request.

Example techniques described herein have a variety of benefits as compared to conventional techniques for providing applications in an immersive non-windowed environment. For instance, the example techniques may enable an application that is configured to operate in a windowed environment to operate in a manner that is compatible with an immersive non-windowed environment. The example techniques may be capable of intercepting a request for functionality associated with the application that is not applicable to the immersive non-windowed environment, implement alternative functionality that is applicable to the immersive non-windowed environment in lieu of the requested functionality, block the request, block an instruction from an operating system that is provided in response to the request, convert the instruction from the operating system from a form that is not compatible with the immersive non-windowed environment to a form that is compatible with the immersive non-windowed environment, etc.

The example techniques may be capable of removing an application's authority to control its positioning (e.g., size, movement, and/or location on a screen). For instance, the authority may be given to a user of the application. Accordingly, the example techniques may be capable of ensuring that the user's instructions regarding positioning of the application are honored, rather than relying on goodwill of the application to honor the instructions.

The example techniques may substantially increase reliability and/or efficiency of a computing device with respect to executing an application, which is configured to operate in a windowed environment, in an immersive non-windowed environment. The example techniques may increase user interaction performance. For instance, such performance may be increased by requiring an application to comply with a user's instructions with regard to positioning of the application, not implementing functionality that is not applicable to the immersive no-windowed environment (e.g., windows occluding other windows), etc.

Figure 1:
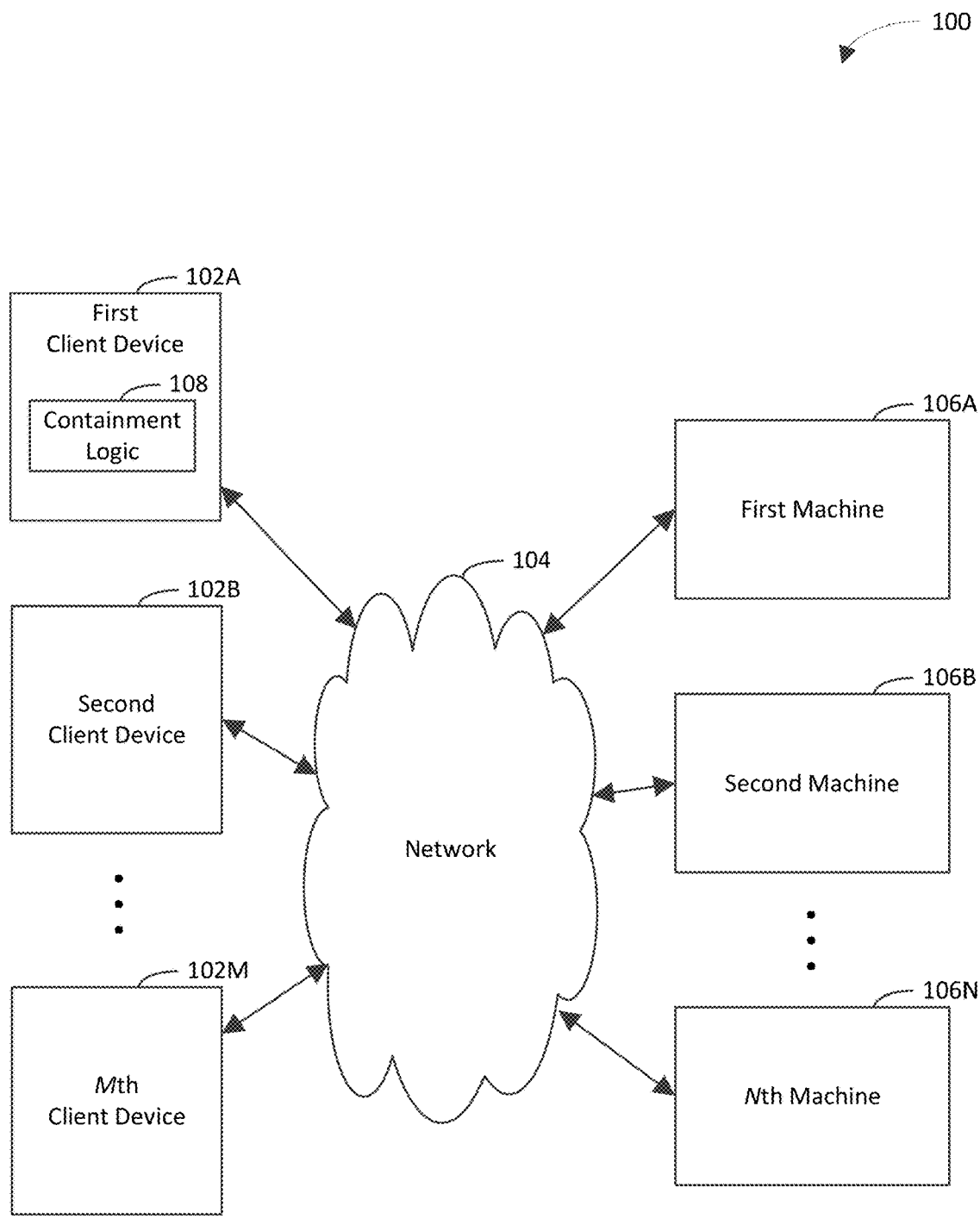
FIG. 1 is a block diagram of an example containment system in accordance with an embodiment.

FIG. 1 is a block diagram of an example containment system 100 in accordance with an embodiment. Generally speaking, containment system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, containment system 100 contains an application in an immersive non-windowed environment. For instance, containing the application in the immersive non-windowed environment may involve selectively implementing functionality that is associated with the application based at least in part on whether the functionality is applicable to the immersive non-windowed environment. Detail regarding techniques for containing an application in an immersive non-windowed environment is provided in the following discussion.

As shown in FIG. 1, containment system 100 includes a plurality of client devices 102A-102M, a network 104, and a plurality of machines 106A-106N. Communication among client devices 102A-102M and machines 106A-106N is carried out over network 104 using well-known network communication protocols. Network 104 may be a wide-area network (e.g., the Internet), a local area network (LAN), another type of network, or a combination thereof.

Client devices 102A-102M are processing systems that are capable of communicating with machines 106A-106N. An example of a processing system is a system that includes at least one processor that is capable of manipulating data in accordance with a set of instructions. For instance, a processing system may be a computer, a personal digital assistant, etc. Client devices 102A-102M are configured to provide requests to machines 106A-106N for requesting information stored on (or otherwise accessible via) machines 106A-106N. For instance, a user may initiate a request for executing a computer program (e.g., an application) using a client (e.g., a Web browser, Web crawler, or other type of client) deployed on a client device 102 that is owned by or otherwise accessible to the user. In accordance with some example embodiments, client devices 102A-102M are capable of accessing domains (e.g., Web sites) hosted by servers 104A-104N, so that client devices 102A-102M may access information that is available via the domains. Such domain may include Web pages, which may be provided as hypertext markup language (HTML) documents and objects (e.g., files) that are linked therein, for example.

Client devices 102A-102M may include any client-enabled system or device, including but not limited to a desktop computer, a laptop computer, a tablet computer, a personal digital assistant, a cellular telephone, a wearable device, or the like. It will be recognized that any one or more client devices 102A-102M may communicate with any one or more machines 106A-106N.

First client device 102A is shown to include containment logic 108 for illustrative purposes. Containment logic 108 is configured to contain an application in an immersive non-windowed environment. For example, containment logic 108 may establish a communication channel between the application and an operating system to broker window-related communications between the application and the operating system. Each of the application and the operating system may be executed by first client device 102A and/or one or more of machines 106A-106N. For instance, each of the application and the operating system (or server-side aspects thereof) may be implemented as a web-based service. In accordance with this example, containment logic 108 may enforce a windowing policy via the communication channel in the immersive non-windowed environment using the window-related communications. A windowing policy is a policy that defines how window-related communications are to be processed. Containment logic 108 may be incorporated at least partially (e.g., entirely (e.g., entirely) in the operating system, though the example embodiments is not limited in this respect.

In another example, containment logic 108 may redefine APIs that are associated with the application from a first definition state to a second definition state based at least in part on the application being in the immersive non-windowed environment. The first definition state is characterized by the APIs defining window-based functionalities. The second definition state is characterized by the APIs defining immersive non-windowed functionalities. In accordance with this example, a first functionality of the window-based functionalities is defined by the designated API in the first state, and a second functionality of the immersive non-windowed functionalities is defined by the designated API in the second state. In further accordance with this example, containment logic 108 may implement the second functionality in lieu of the first functionality in response to receipt of an API call for an API from the application.

Example techniques for containing an application in an immersive non-windowed environment are discussed in greater detail below with reference to FIGS. 2-10.

Machines 106A-106N are processing systems that are capable of communicating with client devices 102A-102M. Machines 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, machines 106A-106N are configured to host respective Web sites, so that the Web sites are accessible to users of containment system 100.

Containment logic 108 is shown to be incorporated in first client device 102A for illustrative purposes and is not intended to be limiting. It will be recognized that at least a portion (e.g., all) of containment logic 108 may be external to first client device 102A. For example, at least a portion of containment logic 108 may be incorporated in any one or more of the machines 106A-106N. In accordance with this example, client-side aspects of containment logic 108 may be incorporated in client device 102A, and server-side aspects of containment logic 108 may be incorporated in one or more of the machines 106A-106N.

Containment logic 108 may be implemented in various ways to contain an application in an immersive non-windowed environment, including being implemented in hardware, software, firmware, or any combination thereof. For example, containment logic 108 may be implemented as computer program code configured to be executed in one or more processors. In another example, containment logic 108 may be implemented as hardware logic/electrical circuitry. For instance, containment logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

It will be recognized that any one or more of client devices 102A-102M and/or any one or more of machines 106A-106N may be implemented as a virtual machine, though the scope of the example embodiments is not limited in this respect.

Figure 2:
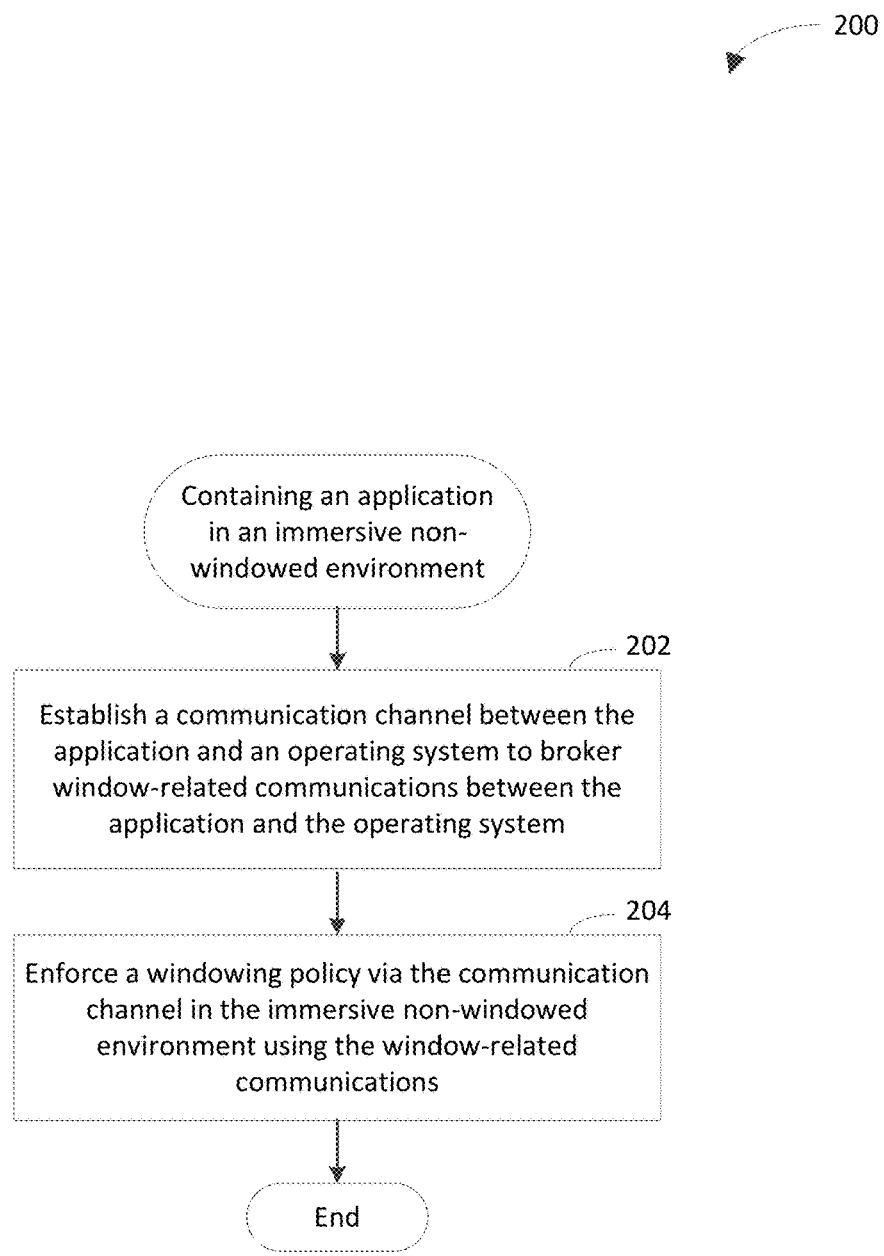
FIG. 2 depicts a flowchart of an example method for containing an application in an immersive non-windowed environment in accordance with an embodiment.

FIG. 2 depicts a flowchart 200 of an example method for containing an application in an immersive non-windowed environment in accordance with an embodiment. Flowchart 200 may be performed by any one or more of client devices 102A-102M and/or any one or more of machines 106A-106N shown in FIG. 1, for example. For illustrative purposes, flowchart 200 is described with respect to a computing system 300 shown in FIG. 3. As shown in FIG. 3, computing system 300 includes an operating system 302, containment logic 304, an application 306, a store 308, and a screen 328. Containment logic 304 includes establishment logic 310 and enforcement logic 312. Further structural and operational embodiments will be apparent to persons skilled in the relevant art(s) based on the discussion regarding flowchart 200.

As shown in FIG. 2, the method of flowchart 200 begins at step 202. In step 202, a communication channel is established between the application and an operating system to broker window-related communications between the application and the operating system. In an example implementation, establishment logic 310 establishes a communication channel 322 between the application 306 and the operating system 302, as depicted by arrow 324, to broker window-related communications between the application 306 and the operating system 302. Accordingly, establishment logic 310 may enable instructions to be provided to the application and/or requests to be received from the application.

For example, establishment logic 310 may be implemented as (or incorporated into) a window manager. A window manager is system software that is configured to control positioning and/or appearance of windows in a windowed environment. For instance, the window manager may be configured to enable a user of computing system 300 to open, close, minimize, maximize, move, and/or resize windows that are running on computing device 300.

At step 204, a windowing policy is enforced via the communication channel in the immersive non-windowed environment using the window-related communications. A windowing policy is a policy that defines how window-related communications are to be processed. For example, the windowing policy may include rules that define how windows may be manipulated. Accordingly, changing from one windowing policy to another windowing policy may require re-mapping of the rules. In an example implementation, enforcement logic 312 enforces a windowing policy 320 via the communication channel 322 in the immersive non-windowed environment using the window-related communications. For example, store 308 may be configured to store the windowing policy 320. Store 308 may be further configured to provide the windowing policy 320 and/or information regarding the windowing policy 320 in response to queries that request the windowing policy 320 and/or information regarding the windowing policy 320. Store 308 may be any suitable type of store. One type of store is a database. For instance, store 308 may be a relational database, an entity-relationship database, an object database, an object relational database, an extensible markup language (XML) database, etc. In accordance with this example, enforcement logic 312 may retrieve the windowing policy 320 from store 308. In accordance with this example, enforcement logic 312 may review the windowing policy 320 to determine provisions therein, which are to be enforced.

For example, enforcement logic 312 may be implemented as (or incorporated into) a shell. A shell is a user interface that is configured to access services of an operating system (e.g., operating system 302). For instance, the shell may use a command-line interface (CLI) or a graphical user interface (GUI) to provide access to the services of the operating system to a user of computing system 300.

In an example embodiment, step 204 includes issuing an instruction to the application in response to receiving an event from the application. For instance, enforcement logic 312 may issue the instruction to the application 306 in response to receiving the event from the application 306. For example, the event may be an API call. In accordance with this embodiment, the operating system 302 may include a positioner. The positioner may be configured to monitor communications to identify events from establishment logic 310 that are received from the application 306. For instance, an event may indicate that the application 306 intends to position itself (e.g., a window that includes the application 306) on screen 328. The application may intend to position itself by changing its size and/or location on screen 328 and/or by opening a new window in which the application 306 is to be displayed on screen 328. The positioner (or one or more portions thereof) may be included in a window manager and/or a shell, though the scope of the example embodiments is not limited in this respect.

In a first aspect of this embodiment, the instruction may require the application to position a window at a designated location of a screen in the immersive non-windowed environment. For example, the instruction may require the application 306 to position the window at the designated location of screen 328. In accordance with this example, the instruction may require the application 306 to position the window at the designated location of screen 328 in response to the event indicating that the application 306 intended to change its location on screen 328 (e.g., to a location that is different from the designated location).

In a second aspect of this embodiment, the instruction may require the application to provide a window having a designated size on a screen in the immersive non-windowed environment. For example, the instruction may require the application 306 to provide the window having the designated size on screen 328. In accordance with this example, the instruction may require the application 306 to provide the window having the designated size on screen 328 in response to the event indicating that the application 306 intended to change its size on screen 328 (e.g., to a size that is different from the designated size) or in response to the event indicating that the application 306 intended to open a new window in which the application 306 was to be displayed on screen 328.

In another example embodiment, step 204 includes intercepting and blocking an instruction that is intended to be provided from the operating system to the application based on the instruction not being applicable to the immersive non-windowed environment. In an example embodiment, enforcement logic 312 is configured to intercept and block the instruction that is intended to be provided from the operating system 302 to the application 306 based on the instruction not being applicable to the immersive non-windowed environment. For instance, the instruction may indicate that the application 306 is to be restored from a title bar.

In some example embodiments, one or more steps 202 and/or 204 of flowchart 200 may not be performed. Moreover, steps in addition to or in lieu of steps 202 and/or 204 may be performed.

FIGS. 4, 5A, 5B, and 6 depict flowcharts 400, 500, 550, and 600 of example methods for enforcing a windowing policy in accordance with embodiments. For instance, the methods of flowcharts 400, 500, 550, and 600 may be example implementations of step 204 shown in FIG. 2. Flowcharts 400, 500, 550, and 600 are described accordingly in the following discussion. Flowcharts 400, 500, 550, and 600 may be performed by enforcement logic 312 shown in FIG. 3, for example. For illustrative purposes, flowcharts 500, 550, and 600 are described with respect to enforcement logic 700 shown in FIG. 7, which is an example implementation of enforcement logic 312 of FIG. 3. Enforcement logic 700 includes conversion logic 702, interception logic 704, and provision logic 706. Further structural and operational embodiments will be apparent to persons skilled in the relevant art(s) based on the discussion regarding flowcharts 400, 500, 550, and 600.

Figure 4:
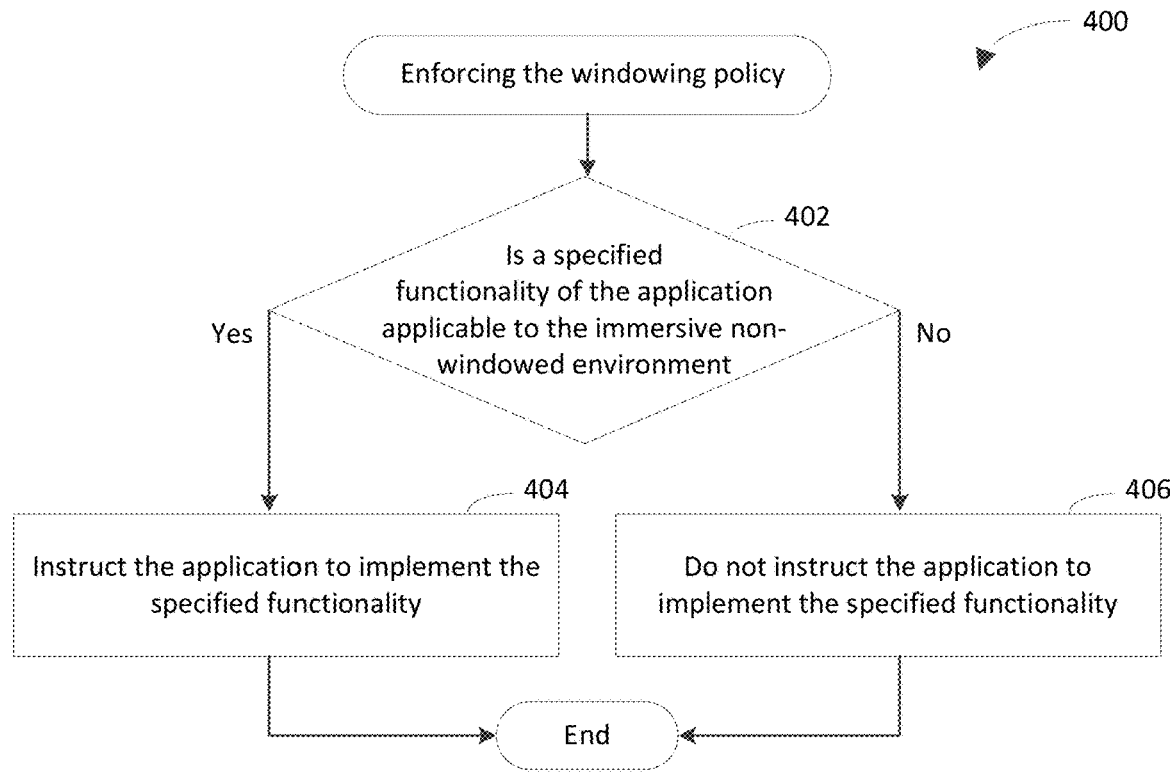

As shown in FIG. 4, the method of flowchart 400 begins at step 402. In step 402, a determination is made whether a specified functionality of the application is applicable to the immersive non-windowed environment. If the specified functionality is applicable to the immersive non-windowed environment, flow continues to step 404. Otherwise, flow continues to step 406. In an example implementation, the operating system 302 determines whether the specified functionality of the application 306 is applicable to the immersive non-windowed environment. The operating system 302 may generate an instruction 316 in response to determining whether the specified functionality of the application 306 is applicable to the immersive non-windowed environment. The instruction 316 may indicate that the specified functionality is to be implemented in response to the specified functionality being applicable to the immersive non-windowed environment. The instruction 316 may indicate that the specified functionality is not to be implemented in response to the specified functionality not being applicable to the immersive non-windowed environment.

In an aspect of this implementation, the operating system 302 may receive an event (e.g., an API call) from the application 302. The event may indicate that the specified functionality is to be implemented. For instance, the event may request implementation of the specified functionality. In accordance with this example, the operating system may determine whether the specified functionality is applicable to the immersive non-windowed environment in response to receipt of the event.

In another aspect of this implementation, the operating system 302 may provide an inquiry 314 to the application 306. The inquiry 314 may request an indication of functionality that is associated with the application 306. In accordance with this example, the application 306 may provide functionality information 318 to the operating system 302 in response to receipt of the inquiry 314. The functionality information may indicate that the specified functionality is associated with the application 306. The operating system 302 may determine whether the specified functionality is applicable to the immersive non-windowed environment in response to receipt of the functionality information 318.

At step 404, the application is instructed to implement (e.g., perform) the specified functionality. For instance, the application may be instructed to implement the specified functionality based on the specified functionality being applicable to the immersive non-windowed environment. In an example implementation, the operating system 302 instructs the application 306 to implement the specified functionality. In accordance with this implementation, the operating system 302 may generate the instruction 316 to specify that the specified functionality is to be implemented based on a determination that the specified functionality is applicable to the immersive non-windowed environment. In further accordance with this implementation, the operating system 302 may provide the instruction 316 to the application 306.

At step 406, the application is not instructed to implement the specified functionality. For instance, the application may not be instructed to implement the specified functionality based on the specified functionality not being applicable to the immersive non-windowed environment. In an example implementation, the operating system 302 does not instruct the application 306 to implement the specified functionality. For instance, the operating system 302 may not provide the instruction 316 based on a determination that the specified functionality is not applicable to the immersive non-windowed environment.

It will be recognized that computing system 300 may not include one or more of operating system 302, containment logic 304, application 306, store 308, establishment logic 310, enforcement logic 312, and/or screen 328. Furthermore, computing system 300 may include components in addition to or in lieu of operating system 302, containment logic 304, application 306, store 308, establishment logic 310, enforcement logic 312, and/or screen 328.

Figure 5A:
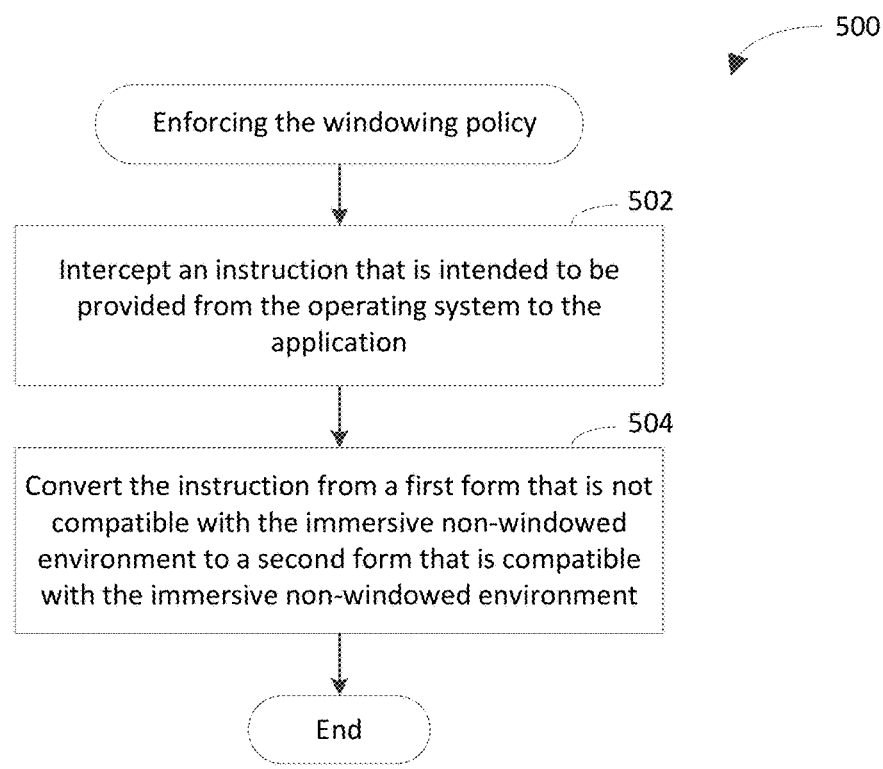

As shown in FIG. 5A, the method of flowchart 500 begins at step 502. In step 502, an instruction that is intended to be provided from the operating system to the application is intercepted. In an example implementation, interception logic 704 intercepts an instruction 708 that is intended to be provided from the operating system (e.g., operating system 302) to the application (e.g., application 306). In accordance with this implementation, interception logic 708 may determine whether the instruction 708 is compatible with the immersive non-windowed environment. In further accordance with this implementation, interception logic 704 may forward the instruction 708 to conversion logic 702 in response to a determination that the instruction 708 is not compatible with the immersive non-windowed environment. For example, the instruction 708 may indicate that the application (e.g., a window that includes the application) is to be minimized, maximized, restored, moved, and/or resized.

At step 504, the instruction is converted from a first form that is not compatible with the immersive non-windowed environment to a second form that is compatible with the immersive non-windowed environment. In an example implementation, conversion logic 702 converts the instruction 708 from a first form that is not compatible with the immersive non-windowed environment to a second form that is compatible with the immersive non-windowed environment to provide a converted instruction 712.

For example, the first form may be configured to control a move-size loop that is associated with the application. A move-size loop defines how an operating system communicates with an application when the application is being dragged or re-sized by a user. Accordingly, the move-size loop may provide messages about moving and/or sizing that the application may continually process in a looping fashion. In accordance with this example, the second form may be configured to control positioning of the application outside a context of the move-size loop. In an aspect of this example, the second form may be configured to block the move-size loop.

In another aspect of this example, the second form may be configured to position thumbnail(s) that represent the application in lieu of the application on a screen until a completion indicator (e.g., deselection of the thumbnail(s)) is received. For instance, the thumbnail(s) may be moved independently from a window that is associated with the application. In accordance with this aspect, the completion indicator may indicate that the thumbnail(s) are located at a location on the screen at which the application is to be positioned. In accordance with this aspect, the application may be positioned at the location of the thumbnail(s) in response to receipt of the completion indicator. For instance, the application may replace the thumbnail(s) at the location on the screen. An animation may be performed to transition the application from an initial location on the screen to the location at which the thumbnail(s) are positioned, though the scope of the example embodiments is not limited in this respect.

In yet another aspect of this example, the second form may be configured to cause other applications to be repositioned (e.g., resized or relocated) to accommodate positioning of the application on a screen. For instance, the other applications may be repositioned (e.g., as the thumbnail(s) are positioned) so that the application and the other applications do not overlap on the screen (e.g., at a time instance at which positioning of the application is complete). In one implementation, if a thumbnail of the application is dragged to overlap with a target application, the second form may cause the application that was dragged and the target application to switch places on the screen. In accordance with this implementation, the application (or an icon associated therewith) may switch places with each successive application (or an icon associated therewith) along a row of applications (or icons associated therewith) as the application is dragged along the row.

As illustrated by this example, the second form may enable enforcement logic 312 to control user experience policy and/or windowing policy with regard to the application.

Figure 5B:
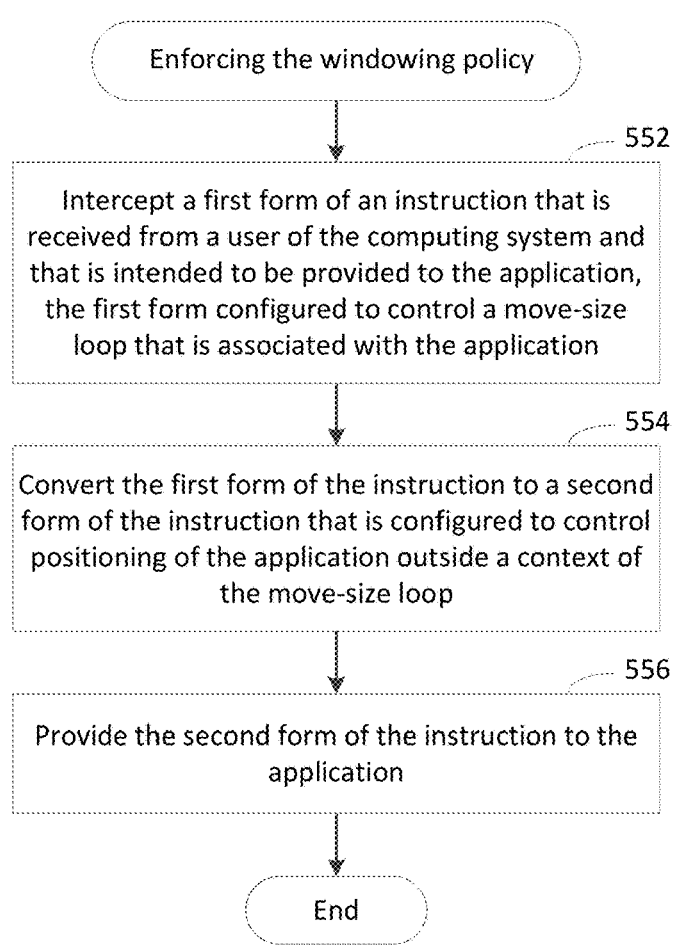

As shown in FIG. 5B, the method of flowchart 550 begins at step 552. In step 552, a first form of an instruction that is received from a user of the computing system and that is intended to be provided to the application is intercepted. The first form is configured to control a move-size loop that is associated with the application. In an example implementation, interception logic 704 intercepts a first form of an instruction 708 that is received from a user of the computing system (e.g., computing system 300) and that is intended to be provided to the application (e.g., application 306). In accordance with this implementation, interception logic 708 may determine whether the instruction 708 is compatible with the immersive non-windowed environment. For instance, interception logic 708 may determine that the instruction 708 is not compatible with the immersive non-windowed environment based on the instruction 708 being in the first form, which is configured to control the move-size loop that is associated with the application. In further accordance with this implementation, interception logic 704 may forward the instruction 708 to conversion logic 702 in response to a determination that the instruction 708 is not compatible with the immersive non-windowed environment.

At step 554, the first form of the instruction is converted to a second form of the instruction that is configured to control positioning of the application outside a context of the move-size loop. In an example implementation, conversion logic 702 converts the first form of the instruction 708 to a second from of the instruction 708 that is configured to control positioning of the application outside the context of the move-size loop to provide the converted instruction 712.

At step 556, the second form of the instruction is provided to the application. For example, the second form of the instruction may be provided in lieu of the first form of the instruction to the application. In another example, the instruction may pertain to sizing the application, moving the application, or positioning the application at a specified location on a screen in the immersive non-windowed environment. In an example implementation, conversion logic 702 provides the second form of the instruction 708 to the application.

In an example embodiment, the second form of the instruction is configured to cause a thumbnail, which represents the desktop computer application, in lieu of the desktop computer application to be positioned on a screen of the computing system until a completion indicator is received. In accordance with this embodiment, the completion indicator indicates that the thumbnail is located at a specified location on the screen at which the desktop computer application is to be positioned. In further accordance with this embodiment, the second form of the instruction is configured to cause the desktop computer application to be positioned at the specified location in response to receipt of the completion indicator.

In an aspect of this embodiment, the second form of the instruction is configured to cause the desktop computer application and a target application to switch places on the screen in response to the thumbnail overlapping the target application on the screen when the completion indicator is received.

In another example embodiment, the second form of the instruction is configured to cause one or more other computer applications to be repositioned to accommodate positioning of the desktop computer application on a screen of the computing system.

Figure 6:
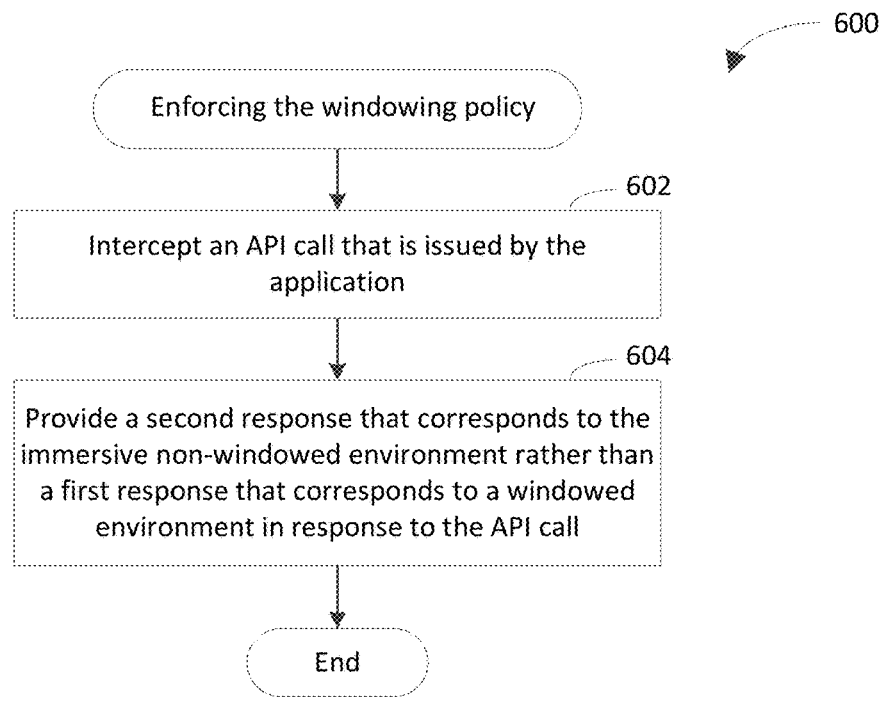

As shown in FIG. 6, the method of flowchart 600 begins at step 602. In step 602, an API call that is issued by the application is intercepted. In an example implementation, interception logic 704 intercepts an API call 710 that is issued by the application (application 306). In accordance with this implementation, interception logic 704 may forward the API call 710 to provision logic 706.

At step 604, a second response that corresponds to the immersive non-windowed environment rather than a first response that corresponds to a windowed environment is provided in response to the API call. In an example implementation, provision logic 706 may provide a response 714 that corresponds to the immersive non-windowed environment rather than an alternative response that corresponds to the windowed environment in response to the API call 710. For example, provision logic 706 may determine that the alternative response corresponds to the windowed environment. In accordance with this example, provision logic 706 may provide the response 714 in response to a determination that the alternative response corresponds to the windowed environment. For example, the alternative response may indicate that a dialog box is to be provided on the screen 328. In one aspect of this example, the dialog box may indicate that the application is to be closed. In another aspect the dialog box may provide an option to save a file. In yet another aspect, the dialog box may provide an option to open a file and/or to select a file to be opened from a plurality of files.

It will be recognized that enforcement logic 700 may not include one or more of conversion logic 702, interception logic 704, and/or provision logic 706. Furthermore, enforcement logic 700 may include components in addition to or in lieu of conversion logic 702, interception logic 704, and/or provision logic 706.

FIG. 8 depicts a flowchart 800 of an example method for controlling an application in an immersive non-windowed environment in accordance with an embodiment. Flowchart 800 may be performed by any one or more of client devices 102A-102M and/or any one or more of machines 106A-106N shown in FIG. 1, for example. For illustrative purposes, flowchart 800 is described with respect to a computing system 900 shown in FIG. 9. As shown in FIG. 9, computing system 900 includes an operating system 902, containment logic 904, and a screen 908. Containment logic 904 includes definition logic 910 and implementation logic 912. Screen 908 is shown to display an application 906. Some example embodiments are described with respect to implementation logic 1000 of FIG. 10, which is an example implementation of implementation logic 912 of FIG. 9. Implementation logic 1000 includes interception logic 1002 and conversion logic 1004. Further structural and operational embodiments will be apparent to persons skilled in the relevant art(s) based on the discussion regarding flowchart 900.

As shown in FIG. 8, the method of flowchart 800 begins at step 802. In step 802, APIs that are associated with the application are redefined from a first definition state to a second definition state based at least in part on the application being in the immersive non-windowed environment. The first definition state is characterized by the APIs defining a plurality of window-based functionalities. A window-based functionality is a functionality that is applicable to a windowed environment and that is not applicable to the immersive non-windowed environment. The second definition state is characterized by the APIs defining a plurality of immersive non-windowed functionalities. An immersive non-windowed functionality is a functionality that is applicable to the immersive non-windowed environment. In an example implementation, definition logic 910 redefines APIs 914 that are associated with the application 906 from the first definition state to the second definition state based at least in part on the application 906 being in the non-windowed environment to provide redefined APIs 922. For example, definition logic 910 may redefine the APIs 914 that are associated with the application 906 in response to environment information 916. In accordance with this example, the environment information 916 may indicate (e.g., specify)

that the application 906 is in the non-windowed environment. In accordance with this implementation, the first definition state is characterized by the APIs 914 defining a plurality of window-based functionalities. In further accordance with this implementation, the second definition state is characterized by the APIs 914 defining a plurality of immersive non-windowed functionalities.

In an example embodiment, step 802 includes taking authority to control positioning of the application on a screen of a computing system from the application. Examples of positioning an application include but are not limited to sizing (e.g., resizing) a window in which the application is displayed (e.g., selecting a size of the window from a plurality of potential sizes), moving a window in which the application is displayed from a first location on a screen to a second location on the screen that is different from the first location (e.g., selecting the second location from a plurality of potential locations on the screen), and placing a window in which the application is displayed at a location on a screen (e.g., selecting the location from a plurality of potential locations on the screen). For instance, definition logic 910 may take the authority to control the positioning of the application 906 on screen 908 from the application 906. In accordance with this embodiment, step 802 further includes providing the authority to a user of the application. For instance, definition logic 910 may provide the authority to the user of computing system 900.

In another example embodiment, step 802 includes determining whether each functionality of a corpus of functionalities is applicable to the immersive non-windowed environment. The corpus of functionalities includes the plurality of window-based functionalities, which are not applicable to the immersive non-windowed environment, and one or more other functionalities, which are applicable to the immersive non-windowed environment. For instance, definition logic 910 may determine whether each functionality of the corpus of functionalities is applicable to the immersive non-windowed environment. In accordance with this example, step 902 further includes for each functionality of the corpus of functionalities, if the respective functionality is applicable to the immersive non-windowed environment, not redefining the API that defines the respective functionality from the first definition state to the second definition state, based at least in part on the respective functionality being applicable to the immersive non-windowed environment. For instance, definition logic 910 may not redefine the API that defines the respective functionality if the respective functionality is applicable to the immersive non-windowed environment. APIs that are not redefined may be referred to cumulatively as non-redefined APIs 924. In further accordance with this example, step 802 further includes for each functionality of the corpus of functionalities, if the respective functionality is not applicable to the immersive non-windowed environment, redefining the API that defines the respective functionality from the first definition state to the second definition state, based at least in part on the respective functionality not being applicable to the immersive non-windowed environment. For instance, definition logic 910 may redefine the API that defines the respective functionality if the respective functionality is not applicable to the immersive non-windowed environment. APIs that are redefined may be referred to cumulatively as redefined APIs 924.

At step 804, an API call for a designated API is received from the application. In an example implementation, implementation logic 912 receives an API call 920 for the designated API from the application 906.

At step 806, a second functionality of the plurality of immersive non-windowed functionalities, which is defined by the designated API in the second state, is implemented in lieu of a first functionality of the plurality of window-based functionalities, which is defined by the designated API in the first state, in response to receiving the API call. In an example implementation, implementation logic 912 implements the second functionality in lieu of the first functionality in response to receipt of the API call 920.

In an example embodiment, step 806 includes issuing an instruction to the application in response to receiving the API call. For instance, implementation logic 912 may issue an instruction 926 to the application 906 in response to receiving the API call 920. In accordance with this embodiment, the instruction requires the application to position a window at a designated location on a screen of the computing system in the immersive non-windowed environment. For instance, the instruction 926 may require the application 906 to position the window at a designated location on the screen 908 in the immersive non-windowed environment.

In another example embodiment, step 806 includes issuing an instruction to the application in response to receiving the API call. For instance, implementation logic 912 may issue the instruction 926 to the application 906 in response to receiving the API call 920. In accordance with this embodiment, the instruction requires the application to provide a window having a designated size on a screen of the computing system in the immersive non-windowed environment. For instance, the instruction 926 may require the application 906 to provide a window having a designated size on screen 908 in the immersive non-windowed environment.

In some example embodiments, one or more steps 802, 804, and/or 806 of flowchart 800 may not be performed. Moreover, steps in addition to or in lieu of steps 802, 804, and/or 806 may be performed. For instance, in an example embodiment, the method of flowchart 800 further includes intercepting and blocking an instruction that is intended to be provided from an operating system of the computing system to the application based on the instruction not being applicable to the immersive non-windowed environment. For instance, interception logic 1002 of FIG. 10 may intercept and block the instruction that is intended to be provided from the operating system (e.g., operating system 902) to the application (e.g., application 906) based on the instruction not being applicable to the immersive non-windowed environment.

In another example embodiment, the method of flowchart 800 further includes intercepting an instruction that is intended to be provided from an operating system of the computing system to the application. For instance, interception logic 1002 may intercept the instruction that is intended to be provided from the operating system (e.g., operating system 902) to the application (e.g., application 906). In accordance with this embodiment, the method of flowchart 800 further includes converting the instruction from a first form that is not compatible with the immersive non-windowed environment to a second form that is compatible with the immersive non-windowed environment. For instance, conversion logic 1004 may convert the instruction from the first form to the second form.

Each of definition logic 910 and implementation logic 912 (or portion(s) thereof) may be incorporated in a window manager and/or a shell. For instance, the shell may redefine the APIs that are associated with the application at step 802. The window manager may receive the API call for the designated API at step 804. For example, the API call may request implementation of the first functionality. In accordance with this example, the window manager may provide an indicator to the shell in response to receiving the API call for the designated API. The indicator may indicate that implementation of the first functionality is requested. The shell may implement the second functionality in lieu of the first functionality in response to receipt of the indicator.

It will be recognized that computing system 900 may not include one or more of operating system 902, containment logic 904, application 906, screen 908, definition logic 910, and/or implementation logic 912. Furthermore, computing system 900 may include components in addition to or in lieu of operating system 902, containment logic 904, application 906, screen 908, definition logic 910, and/or implementation logic 912. It will be recognized that implementation logic 1000 may not include one or more of interception logic 1002 and/or conversion logic 1004. Furthermore, implementation logic 1000 may include components in addition to or in lieu of interception logic 1002 and/or conversion logic 1004.

Any one or more of client devices 102A-102M, any one or more of machines 106A-106N, containment logic 108, containment logic 304, establishment logic 310, enforcement logic 312, conversion logic 702, interception logic 704, provision logic 706, containment logic 904, definition logic 910, implementation logic 912, interception logic 1002, conversion logic 1004, flowchart 200, flowchart 400, flowchart 500, flowchart 550, flowchart 600, and/or flowchart 800 may be implemented in hardware, software, firmware, or any combination thereof.

For example, any one or more of client devices 102A-102M, any one or more of machines 106A-106N, containment logic 108, containment logic 304, establishment logic 310, enforcement logic 312, conversion logic 702, interception logic 704, provision logic 706, containment logic 904, definition logic 910, implementation logic 912, interception logic 1002, conversion logic 1004, flowchart 200, flowchart 400, flowchart 500, flowchart 550, flowchart 600, and/or flowchart 800 may be implemented, at least in part, as computer program code configured to be executed in one or more processors.

In another example, any one or more of client devices 102A-102M, any one or more of machines 106A-106N, containment logic 108, containment logic 304, establishment logic 310, enforcement logic 312, conversion logic 702, interception logic 704, provision logic 706, containment logic 904, definition logic 910, implementation logic 912, interception logic 1002, conversion logic 1004, flowchart 200, flowchart 400, flowchart 500, flowchart 550, flowchart 600, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example method of containing a desktop computer application, which is configured for use in a windowed environment, in an immersive non-windowed environment using one or more processors of a computing system, a communication channel is established between the desktop computer application and an operating system, using at least one of the one or more processors, to broker window-related communications between the desktop computer application and the operating system. A windowing policy is enforced, using at least one of the one or more processors, via the communication channel in the immersive non-windowed environment using the window-related communications.

In a first aspect of the first example method, enforcing the windowing policy comprises determining by the operating system whether a specified functionality of the desktop computer application is applicable to the immersive non-windowed environment. In accordance with the first aspect, enforcing the windowing policy further comprises, if the specified functionality is applicable to the immersive non-windowed environment, instructing the desktop computer application to implement the specified functionality by the operating system based on the specified functionality being applicable to the immersive non-windowed environment. In further accordance with the first aspect, enforcing the windowing policy further comprises, if the specified functionality is not applicable to the immersive non-windowed environment, not instructing the desktop computer application to implement the specified functionality by the operating system based on the specified functionality not being applicable to the immersive non-windowed environment.

In a second aspect of the first example method, enforcing the windowing policy comprises issuing an instruction to the desktop computer application in response to receiving an event from the desktop computer application. In accordance with the second aspect, the instruction requires the desktop computer application to position a window at a designated location on a screen of the computing system in the immersive non-windowed environment. The second aspect of the first example method may be implemented in combination with the first aspect of the first example method, though the example embodiments are not limited in this respect.

In a third aspect of the first example method, enforcing the windowing policy comprises issuing an instruction to the desktop computer application in response to receiving an event from the desktop computer application. In accordance with the third aspect, the instruction requires the desktop computer application to provide a window having a designated size on a screen of the computing system in the immersive non-windowed environment. The third aspect of the first example method may be implemented in combination with the first and/or second aspect of the first example method, though the example embodiments are not limited in this respect.

In a fourth aspect of the first example method, enforcing the windowing policy comprises intercepting and blocking an instruction that is intended to be provided from the operating system to the desktop computer application based on the instruction not being applicable to the immersive non-windowed environment. The fourth aspect of the first example method may be implemented in combination with the first, second, and/or third aspect of the first example method, though the example embodiments are not limited in this respect.

In a fifth aspect of the first example method, enforcing the windowing policy comprises intercepting an instruction that is intended to be provided from the operating system to the desktop computer application. In accordance with the fifth aspect, enforcing the windowing policy further comprises converting the instruction from a first form that is not compatible with the immersive non-windowed environment to a second form that is compatible with the immersive non-windowed environment. The fifth aspect of the first example method may be implemented in combination with the first, second, third, and/or fourth aspect of the first example method, though the example embodiments are not limited in this respect.

In a sixth aspect of the first example method, an API call that is issued by the desktop computer application is associated with a first response that corresponds to the windowed environment and a second response that corresponds to the immersive non-windowed environment. In accordance with the sixth aspect, enforcing the windowing policy comprises intercepting the API call from the desktop computer application. In further accordance with the sixth aspect, enforcing the windowing policy further comprises providing the second response rather than the first response in response to the API call. The sixth aspect of the first example method may be implemented in combination with the first, second, third, fourth, and/or fifth aspect of the first example method, though the example embodiments are not limited in this respect.

In a seventh aspect of the first example method, enforcing the windowing policy comprises intercepting a first form of an instruction that is received from a user of the computing system and that is intended to be provided to the desktop computer application. In accordance with the seventh aspect, the first form is configured to control a move-size loop that is associated with the desktop computer application. In further accordance with the seventh aspect, enforcing the windowing policy further comprises converting the first form of the instruction to a second form of the instruction that is configured to control positioning of the desktop computer application outside a context of the move-size loop. In further accordance with the seventh aspect, enforcing the windowing policy further comprises providing the second form of the instruction to the desktop computer application. The seventh aspect of the first example method may be implemented in combination with the first, second, third, fourth, fifth, and/or sixth aspect of the first example method, though the example embodiments are not limited in this respect.

In an example of the seventh aspect of the first example method, the second form of the instruction is configured to cause a thumbnail, which represents the desktop computer application, in lieu of the desktop computer application to be positioned on a screen of the computing system until a completion indicator is received. In accordance with this example, the completion indicator indicates that the thumbnail is located at a specified location on the screen at which the desktop computer application is to be positioned. In further accordance with this example, the second form of the instruction is configured to cause the desktop computer application to be positioned at the specified location in response to receipt of the completion indicator.

In an implementation of this example of the seventh aspect of the first example method, the second form of the instruction is configured to cause the desktop computer application and a target application to switch places on the screen in response to the thumbnail overlapping the target application on the screen when the completion indicator is received.

In another example of the seventh aspect of the first example method, the second form of the instruction is configured to cause one or more other computer applications to be repositioned to accommodate positioning of the desktop computer application on a screen of the computing system.

In a second example method of controlling a computer application, which is configured for use in a windowed environment, in an immersive non-windowed environment using one or more processors of a computing system, a plurality of APIs that are associated with the computer application are redefined from a first definition state to a second definition state, using at least one of the one or more processors, based at least in part on the computer application being in the immersive non-windowed environment. The first definition state is characterized by the plurality of APIs defining a plurality of window-based functionalities. The second definition state is characterized by the plurality of APIs defining a plurality of immersive non-windowed functionalities. An API call for a designated API of the plurality of APIs is received from the computer application. A second functionality of the plurality of immersive non-windowed functionalities, which is defined by the designated API in the second state, is implemented, using at least one of the one or more processors, in lieu of a first functionality of the plurality of window-based functionalities, which is defined by the designated API in the first state, in response to receiving the API call.

In a first aspect of the second example method, redefining the plurality of APIs comprises taking authority to control positioning of the computer application on a screen of the computing system from the computer application. In accordance with the first aspect, redefining the plurality of APIs further comprises providing the authority to a user of the computer application.

In a second aspect of the second example method, redefining the plurality of APIs comprises determining whether each functionality of a corpus of functionalities is applicable to the immersive non-windowed environment. The corpus of functionalities includes the plurality of window-based functionalities, which are not applicable to the immersive non-windowed environment, and one or more other functionalities, which are applicable to the immersive non-windowed environment. In accordance with the second aspect, redefining the plurality of APIs further comprises, for each functionality of the corpus of functionalities, if the respective functionality is applicable to the immersive non-windowed environment, not redefining the API that defines the respective functionality from the first definition state to the second definition state, based at least in part on the respective functionality being applicable to the immersive non-windowed environment. In further accordance with the second aspect, redefining the plurality of APIs further comprises, for each functionality of the corpus of functionalities, if the respective functionality is not applicable to the immersive non-windowed environment, redefining the API that defines the respective functionality from the first definition state to the second definition state, based at least in part on the respective functionality not being applicable to the immersive non-windowed environment. The second aspect of the second example method may be implemented in combination with the first aspect of the second example method, though the example embodiments are not limited in this respect.

In a third aspect of the second example method, implementing the second functionality comprises issuing an instruction to the computer application in response to receiving the API call. In accordance with the third aspect, the instruction requires the computer application to position a window at a designated location on a screen of the computing system in the immersive non-windowed environment. The third aspect of the second example method may be implemented in combination with the first and/or second aspect of the second example method, though the example embodiments are not limited in this respect.

In a fourth aspect of the second example method, implementing the second functionality comprises issuing an instruction to the computer application in response to receiving the API call. In accordance with the fourth aspect, the instruction requires the computer application to provide a window having a designated size on a screen of the computing system in the immersive non-windowed environment. The fourth aspect of the second example method may be implemented in combination with the first, second, and/or third aspect of the second example method, though the example embodiments are not limited in this respect.

In a fifth aspect of the second example method, the second example method further comprises intercepting and blocking an instruction that is intended to be provided from an operating system of the computing system to the computer application based on the instruction not being applicable to the immersive non-windowed environment. The fifth aspect of the second example method may be implemented in combination with the first, second, third, and/or fourth aspect of the second example method, though the example embodiments are not limited in this respect.

In a sixth aspect of the second example method, the second example method further comprises intercepting an instruction that is intended to be provided from an operating system of the computing system to the computer application. In accordance with the sixth aspect, the second example method further comprises converting the instruction from a first form that is not compatible with the immersive non-windowed environment to a second form that is compatible with the immersive non-windowed environment. The sixth aspect of the second example method may be implemented in combination with the first, second, third, fourth, and/or fifth aspect of the second example method, though the example embodiments are not limited in this respect.

In a first example system to contain a desktop computer application, which is configured for use in a windowed environment, in an immersive non-windowed environment, at least one element comprises at least one of (a) one or more processors or (b) hardware logic/electrical circuitry. Establishment logic, implemented using the at least one element, is configured to establish a communication channel between the desktop computer application and an operating system to broker window-related communications between the desktop computer application and the operating system. Enforcement logic, implemented using the at least one element, is configured to enforce a windowing policy via the communication channel in the immersive non-windowed environment using the window-related communications.

In a first aspect of the first example system, the first example system further comprises the operating system. In accordance with the first aspect, the operating system is configured to determine whether a specified functionality of the desktop computer application is applicable to the immersive non-windowed environment. In further accordance with the first aspect, the operating system is configured to instruct the desktop computer application to implement the specified functionality in response to the specified functionality being applicable to the immersive non-windowed environment. In further accordance with the first aspect, the operating system is configured to not instruct the desktop computer application to implement the specified functionality in response to the specified functionality not being applicable to the immersive non-windowed environment.

In a second aspect of the first example system, the enforcement logic is configured to issue an instruction to the desktop computer application in response to receipt of an event from the desktop computer application. In accordance with the second aspect, the first example system further comprises a screen. In further accordance with the second aspect, the instruction is configured to require the desktop computer application to position a window at a designated location on the screen in the immersive non-windowed environment. The second aspect of the first example system may be implemented in combination with the first aspect of the first example system, though the example embodiments are not limited in this respect.

In a third aspect of the first example system, the enforcement logic is configured to issue an instruction to the desktop computer application in response to receipt of an event from the desktop computer application. In accordance with the third aspect, the first example system further comprises a screen. In further accordance with the third aspect, the instruction is configured to require the desktop computer application to provide a window having a designated size on the screen in the immersive non-windowed environment. The third aspect of the first example system may be implemented in combination with the first and/or second aspect of the first example system, though the example embodiments are not limited in this respect.

In a fourth aspect of the first example system, the enforcement logic is configured to intercept and block an instruction that is intended to be provided from the operating system to the desktop computer application based on the instruction not being applicable to the immersive non-windowed environment. The fourth aspect of the first example system may be implemented in combination with the first, second, and/or third aspect of the first example system, though the example embodiments are not limited in this respect.

In a fifth aspect of the first example system, the enforcement logic comprises interception logic configured to intercept an instruction that is intended to be provided from the operating system to the desktop computer application. In accordance with the fifth aspect, the enforcement logic further comprises conversion logic configured to convert the instruction from a first form that is not compatible with the immersive non-windowed environment to a second form that is compatible with the immersive non-windowed environment. The fifth aspect of the first example system may be implemented in combination with the first, second, third, and/or fourth aspect of the first example system, though the example embodiments are not limited in this respect.

In a sixth aspect of the first example system, an API call that is issued by the desktop computer application is associated with a first response that corresponds to the windowed environment and a second response that corresponds to the immersive non-windowed environment. In accordance with the sixth aspect, the enforcement logic comprises interception logic configured to intercept the API call from the desktop computer application. In further accordance with the sixth aspect, the enforcement logic further comprises provision logic configured to provide the second response rather than the first response in response to the API call. The sixth aspect of the first example system may be implemented in combination with the first, second, third, fourth, and/or fifth aspect of the first example system, though the example embodiments are not limited in this respect.

In a seventh aspect of the first example system, the enforcement logic comprises interception logic configured to intercept a first form of an instruction that is received from a user of the system and that is intended to be provided to the desktop computer application, the first form configured to control a move-size loop that is associated with the desktop computer application. In accordance with the seventh aspect, the enforcement logic further comprises conversion logic configured to convert the first form of the instruction to a second form of the instruction that is configured to control positioning of the desktop computer application outside a context of the move-size loop. In further accordance with the seventh aspect, the conversion logic is further configured to provide the second form of the instruction to the desktop computer application. The seventh aspect of the first example system may be implemented in combination with the first, second, third, fourth, fifth, and/or sixth aspect of the first example system, though the example embodiments are not limited in this respect.

In an example of the seventh aspect of the first example system, the first example system further comprises a screen. In accordance with this example, the second form of the instruction is configured to cause a thumbnail, which represents the desktop computer application, in lieu of the desktop computer application to be positioned on the screen until a completion indicator is received. In further accordance with this example, the completion indicator indicates that the thumbnail is located at a specified location on the screen at which the desktop computer application is to be positioned. In further accordance with this example, the second form of the instruction is configured to cause the desktop computer application to be positioned at the specified location in response to receipt of the completion indicator.

In an implementation of this example of the seventh aspect of the first example system, the second form of the instruction is configured to cause the desktop computer application and a target application to switch places on the screen in response to the thumbnail overlapping the target application on the screen when the completion indicator is received.

In another example of the seventh aspect of the first example system, the first example system further comprises a screen. In accordance with this example, the second form of the instruction is configured to cause one or more other computer applications to be repositioned to accommodate positioning of the desktop computer application on the screen.

In a second example system to control a computer application, which is configured for use in a windowed environment, in an immersive non-windowed environment, at least one element comprises at least one of (a) one or more processors or (b) hardware logic/electrical circuitry. Definition logic, implemented using the at least one element, is configured to redefine a plurality of APIs that are associated with the computer application from a first definition state to a second definition state based at least in part on the computer application being in the immersive non-windowed environment. The first definition state is characterized by the plurality of APIs defining a plurality of window-based functionalities. The second definition state is characterized by the plurality of APIs defining a plurality of immersive non-windowed functionalities. Implementation logic, implemented using the at least one element, is configured to implement a second functionality of the plurality of immersive non-windowed functionalities, which is defined by a designated API of the plurality of APIs in the second state, in lieu of a first functionality of the plurality of window-based functionalities, which is defined by the designated API in the first state, in response to receipt of an API call for the designated API from the computer application.

In a first aspect of the second example system, the second example system further comprises a screen. In accordance with the first aspect, the definition logic is configured to take authority to control positioning of the computer application on the screen from the computer application. In further accordance with the first aspect, the definition logic is further configured to provide the authority to a user of the computer application.

In a second aspect of the second example system, the definition logic is configured to determine whether each functionality of a corpus of functionalities is applicable to the immersive non-windowed environment. In accordance with the second aspect, the corpus of functionalities includes the plurality of window-based functionalities, which are not applicable to the immersive non-windowed environment, and one or more other functionalities, which are applicable to the immersive non-windowed environment. In further accordance with the second aspect, the definition logic is configured to not redefine the API that defines each functionality of the corpus of functionalities that is applicable to the immersive non-windowed environment from the first definition state to the second definition state in response to the respective functionality being applicable to the immersive non-windowed environment. In further accordance with the second aspect, the definition logic is configured to redefine the API that defines each functionality of the corpus of functionalities that is not applicable to the immersive non-windowed environment from the first definition state to the second definition state in response to the respective functionality not being applicable to the immersive non-windowed environment. The second aspect of the second example system may be implemented in combination with the first aspect of the second example system, though the example embodiments are not limited in this respect.

In a third aspect of the second example system, the implementation logic is configured to issue an instruction to the computer application in response to receipt of the API call. In accordance with the third aspect, the second example system further comprises a screen. In further accordance with the third aspect, the instruction is configured to require the computer application to position a window at a designated location on the screen in the immersive non-windowed environment. The third aspect of the second example system may be implemented in combination with the first and/or second aspect of the second example system, though the example embodiments are not limited in this respect.

In a fourth aspect of the second example system, the implementation logic is configured to issue an instruction to the computer application in response to receiving the API call. In accordance with the fourth aspect, the second example system further comprises a screen. In further accordance with the fourth aspect, the instruction is configured to require the computer application to provide a window having a designated size on the screen in the immersive non-windowed environment. The fourth aspect of the second example system may be implemented in combination with the first, second, and/or third aspect of the second example system, though the example embodiments are not limited in this respect.

In a fifth aspect of the second example system, the second example system further comprises an operating system. In accordance with the fifth aspect, the implementation logic is further configured to intercept and block an instruction that is intended to be provided from the operating system to the computer application based on the instruction not being applicable to the immersive non-windowed environment. The fifth aspect of the second example system may be implemented in combination with the first, second, third, and/or fourth aspect of the second example system, though the example embodiments are not limited in this respect.

In a sixth aspect of the second example system, the second example system further comprises an operating system. In accordance with the sixth aspect, the implementation logic comprises interception logic configured to intercept an instruction that is intended to be provided from the operating system to the computer application. In further accordance with the sixth aspect, the implementation logic further comprises conversion logic configured to convert the instruction from a first form that is not compatible with the immersive non-windowed environment to a second form that is compatible with the immersive non-windowed environment. The sixth aspect of the second example system may be implemented in combination with the first, second, third, fourth, and/or fifth aspect of the second example system, though the example embodiments are not limited in this respect.

A first example computer program product includes a computer-readable medium having computer program logic recorded thereon for enabling a processor-based system to contain a desktop computer application in an immersive non-windowed environment. The computer program logic includes a first program logic module and a second program logic module. The first program logic module is for enabling the processor-based system to establish a communication channel between the desktop computer application and an operating system to broker window-related communications between the desktop computer application and the operating system. The second program logic module is for enabling the processor-based system to enforce a windowing policy via the communication channel in the immersive non-windowed environment using the window-related communications.

A second example computer program product includes a computer-readable medium having computer program logic recorded thereon for enabling a processor-based system to control a computer application in an immersive non-windowed environment. The computer program logic includes a first program logic module and a second program logic module. The first program logic module is for enabling the processor-based system to redefine a plurality of APIs that are associated with the computer application from a first definition state to a second definition state based at least in part on the computer application being in the immersive non-windowed environment. The first definition state is characterized by the plurality of APIs defining a plurality of window-based functionalities. The second definition state is characterized by the plurality of APIs defining a plurality of immersive non-windowed functionalities. The second program logic module is for enabling the processor-based system to implement a second functionality of the plurality of immersive non-windowed functionalities, which is defined by a designated API of the plurality of APIs in the second state, in lieu of a first functionality of the plurality of window-based functionalities, which is defined by the designated API in the first state, in response to receipt of an API call for the designated API from the computer application.

IV. Example Computer System

FIG. 11 depicts an example computer 1100 in which embodiments may be implemented. Any one or more of client devices 102A-102M, any one or more of machines 106A-106N, and/or containment logic 108 shown in FIG. 1; operating system 302, containment logic 304, application 306, store 308, establishment logic 310, enforcement logic 312, and/or screen 328 shown in FIG. 3; conversion logic 702, interception logic 704, and/or provision logic 706 shown in FIG. 7; operating system 902, containment logic 904, application 906, screen 908, definition logic 910, and/or implementation logic 912 shown in FIG. 9; and/or interception logic 1002 and/or conversion logic 1004 shown in FIG. 10 may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing any one or more of containment logic 108, operating system 302, containment logic 304, application 306, establishment logic 310, enforcement logic 312, conversion logic 702, interception logic 704, provision logic 706, operating system 902, containment logic 904, application 906, definition logic 910, implementation logic 912, interception logic 1002, conversion logic 1004, flowchart 200 (including any step of flowchart 200), flowchart 400 (including any step of flowchart 400), flowchart 500 (including any step of flowchart 500), flowchart 550 (including any step of flowchart 550), flowchart 600

(including any step of flowchart 600), and/or flowchart 800 (including any step of flowchart 800), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable storage medium" are used to generally refer to media (e.g., non-transitory media) such as the hard disk associated with hard disk drive 1114, removable magnetic disk 1118, removable optical disk 1122, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to contain a desktop computer application, which is configured for use in a windowed environment, in an immersive non-windowed environment, the system comprising:
   a screen;
   a memory; and
   one or more processors coupled to the memory, the one or more processors configured to:
      establish a communication channel between the desktop computer application and an operating system to broker window-related communications between the desktop computer application and the operating system;
      intercept a first form of an instruction that is configured to move the desktop computer application; and
      convert the first form of the instruction to a second form of the instruction that is configured to position an icon, which is associated with the desktop computer application displayed at an initial location on the screen, in lieu of repositioning the desktop computer application in the immersive non-windowed environment until a completion indicator is received, the completion indicator indicating that the icon is located at a specified location on the screen at which the desktop computer application is to be positioned, the completion indicator further indicating that the desktop computer application is to move from the initial location on the screen to replace the icon at the specified location on the screen in the immersive non-windowed environment.

2. The system of claim 1, wherein the second form of the instruction is configured to cause the desktop computer application to be positioned at the specified location of the icon in response to receipt of the completion indicator.

3. The system of claim 1, wherein the second form of the instruction is configured to cause the desktop computer application and a target application to switch places on the screen in response to the icon overlapping the target application on the screen when the completion indicator is received.

4. The system of claim 1, wherein the second form of the instruction is configured to cause one or more other computer applications to be repositioned to accommodate positioning of the desktop computer application on the screen.

5. The system of claim 1, wherein an API call that is issued by the desktop computer application is associated with a first response that corresponds to the windowed environment and a second response that corresponds to the immersive non-windowed environment; and
   wherein the one or more processors are configured to:
      intercept the API call from the desktop computer application; and provide the second response rather than the first response in response to the API call.

6. The system of claim 1, wherein the one or more processors are further configured to:
position the desktop computer application at the specified location of the icon in the immersive non-windowed environment based at least in part on receipt of the completion indicator.

7. The system of claim 6, wherein the one or more processors are further configured to:
perform an animation to transition the desktop computer application from the initial location on the screen to the specified location at which the icon is located in the immersive non-windowed environment.

8. A method of containing a desktop computer application, which is configured for use in a windowed environment, in an immersive non-windowed environment using one or more processors of a computing system, the method comprising:
establishing, using at least one of the one or more processors, a communication channel between the desktop computer application and an operating system to broker window-related communications between the desktop computer application and the operating system;
intercepting, using at least one of the one or more processors, a first form of an instruction configured to move the desktop computer application; and
converting, using at least one of the one or more processors, the first form of the instruction to a second form of the instruction that is configured to position a thumbnail displayed at an initial location on a screen in lieu of repositioning the desktop computer application to be positioned on the screen in the immersive non-windowed environment until a completion indicator is received, the completion indicator indicating that the thumbnail is located at a specified location on the screen at which the desktop computer application is to be positioned, the completion indicator further indicating that the desktop computer application is to move from the initial location on the screen to replace the thumbnail at the specified location on the screen in the immersive non-windowed environment.

9. The method of claim 8, wherein the second form of the instruction is configured to cause the desktop computer application to be positioned at the specified location of the thumbnail in response to receipt of the completion indicator.

10. The method of claim 8, wherein the second form of the instruction is configured to cause one or more other computer applications to be repositioned to accommodate positioning of the desktop computer application on a screen of the computing system.

11. The method of claim 8, wherein an API call that is issued by the desktop computer application is associated with a first response that corresponds to the windowed environment and a second response that corresponds to the immersive non-windowed environment; and
wherein enforcing the windowing policy comprises:
intercepting the API call from the desktop computer application; and
providing the second response rather than the first response in response to the API call.

12. The method of claim 8, wherein the second form of the instruction is configured to cause the desktop computer application and a target application to switch places on the screen in response to the thumbnail overlapping the target application on the screen when the completion indicator is received.

13. The method of claim 8, further comprising:
positioning the desktop computer application at the specified location of the icon in the immersive non-windowed environment based at least in part on receipt of the completion indicator.

14. The method of claim 13, further comprising:
performing an animation to transition the desktop computer application from the initial location on the screen to the specified location at which the icon is located in the immersive non-windowed environment.

15. A computer program product comprising a computer-readable device having instructions stored thereon that, when executed, enable one or more processors to:
establish a communication channel between the desktop computer application and an operating system to broker window-related communications between the desktop computer application and the operating system;
intercept a first form of an instruction configured to move the desktop computer application; and
convert the first form of the instruction to a second form of the instruction that is configured to position a thumbnail, which is associated with the desktop computer application displayed at an initial location on a screen, in lieu of repositioning the desktop computer application to be positioned on the screen until a completion indicator is received, the completion indicator indicating that the thumbnail is located at a specified location on the screen on which the desktop computer application is to be positioned, the completion indicator further indicating that the desktop computer application is to move from the initial location on the screen to replace the thumbnail at the specified location on the screen in the immersive non-windowed environment.

16. The computer program product of claim 15, wherein the second form of the instruction is configured to cause the desktop computer application to be positioned at the specified location of the thumbnail in response to receipt of the completion indicator.

17. The computer program product of claim 15, wherein the second form of the instruction is configured to cause the desktop computer application and a target application to switch places on the screen in response to the thumbnail overlapping the target application on the screen when the completion indicator is received.

18. The computer program product of claim 15, wherein the second form of the instruction is configured to cause one or more other computer applications to be repositioned to accommodate positioning of the desktop computer application on the screen.

19. The computer program product of claim 15, wherein an API call that is issued by the desktop computer application is associated with a first response that corresponds to the windowed environment and a second response that corresponds to the immersive non-windowed environment; and
wherein the instructions, when executed, enable the one or more processors to:
intercept the API call from the desktop computer application; and
provide the second response rather than the first response in response to the API call.

20. The computer program product of claim 15, wherein the instructions, when executed, enable the one or more processors to:

position the desktop computer application at the specified location of the icon in the immersive non-windowed environment based at least in part on receipt of the completion indicator.

\* \* \* \* \*